United States Patent [19]
Williams

[11] Patent Number: 5,947,460
[45] Date of Patent: Sep. 7, 1999

[54] TRUSS TABLE WITH INTEGRATED POSITIONING STOPS

[75] Inventor: Thomas H. Williams, Edenton, N.C.

[73] Assignee: Tee-Lok Corporation, Edenton, N.C.

[21] Appl. No.: 08/742,242

[22] Filed: Oct. 31, 1996

Related U.S. Application Data

[60] Provisional application No. 60/006,169, Nov. 2, 1995.

[51] Int. Cl.[6] ........................................................ B25B 1/20
[52] U.S. Cl. ............................. 269/37; 269/910; 269/303; 29/281.3
[58] Field of Search ................................ 269/37, 99, 100, 269/101, 910, 303, 315, 319, 900, 307, 20, 25

[56] References Cited

U.S. PATENT DOCUMENTS

| | | | |
|---|---|---|---|
| 4,102,374 | 7/1978 | Klein | 269/37 |
| 4,170,345 | 10/1979 | Townsend | 269/99 |
| 4,647,027 | 3/1987 | Shafto | 269/100 |
| 4,711,437 | 12/1987 | Longenecker et al. | 269/900 |
| 4,943,038 | 7/1990 | Harnden | 269/37 |
| 4,989,654 | 2/1991 | Berkeley | 269/100 |
| 5,085,414 | 2/1992 | Weaver | 269/37 |
| 5,211,381 | 5/1993 | Shaw | 269/37 |
| 5,342,030 | 8/1994 | Taylor | 269/37 |
| 5,608,970 | 3/1997 | Owen | 269/910 |

*Primary Examiner*—David A. Scherbel
*Assistant Examiner*—Lee Wilson
*Attorney, Agent, or Firm*—Myers, Bigel, Sibley & Sajovec

[57] ABSTRACT

A table for forming trusses that includes channels that do not unduly deform or bend during truss construction comprises: a support frame; first and second substantially horizontally-disposed elongate panels; a first channel having a generally horizontal floor and opposed side walls extending upwardly therefrom; and a locator stop. Each of the panels has an upper surface, a lower surface, and opposing lateral edge portions, and the panels are positioned so that their respective upper surfaces are substantially coplanar and so that a first of the lateral edge portions of the first panel is in adjacent, non-contacting relationship with a first of the lateral edge portions of the second panel, thereby forming a gap therebetween. One of the side walls of the channel supports the lower surface of the first panel, and the other of the side walls supports the lower surface of the second panel. The channel floor is supported by the frame and is positioned beneath the gap between the first and second panels so that the first lateral edge portion of the first panel and the first lateral edge portion of the second panel overhang the channel floor. The locator stop includes a stop portion that resides above the panel upper surfaces, a slide portion that resides below the panel lower surfaces and that slides within the channel, and a unit for clamping the panels between the stop portion and the slide portion to prevent relative movement therebetween that extends within the gap.

8 Claims, 6 Drawing Sheets

TRUSS TABLE WITH INTEGRATED POSITIONING STOPS

RELATED APPLICATIONS

This application claims the benefit of U.S. Provisional Application No. 60/006,169, filed Nov. 2, 1995.

FIELD OF THE INVENTION

This invention relates generally to truss tables, and more particularly relates to truss tables having integrated positioning stops.

BACKGROUND OF THE INVENTION

Trusses for the roof and floor of a dwelling typically comprise a series of lumber planks arranged in a triangulated pattern. Truss design varies from house to house because of consumer demand for individualized home design, but within a single home generally several trusses of identical configuration will be employed.

A particularly time-consuming task of truss construction is the "set-up" process, which is the placement of locator stops on a truss table into positions in which they force truss planks into the proper position and orientation for subsequent attachment. Each set of planks is precut to the proper length and end angle, but must be arranged on a truss table in the correct triangulated truss configuration prior to being fixed into that configuration with truss plates.

Because set-up can be so time consuming, often a set-up system is used to hasten the set-up process. A set-up system typically includes a number of locator stops, or "jigs", which are quickly positioned on the truss table in a pattern that defines the proper placement of planks on the table. The positions of the jigs are usually predetermined for the truss manually or by a software program associated with the set-up system. The planks are then arranged on the table, with their positions and relative orientations being defined by the positions of the set-up jigs. Semi-permanent locator stops are then placed around the planks based on the location of the planks. Generally, the truss table will include a grid of holes which receive pins that secure the locator stops; alternatively (if the truss table has a wooden support surface), the semi-permanent locator stops can be attached to the table surface with nails. These locator stops are considerably larger than the set-up jigs and are capable of fine translatory and angular adjustment so that pressure can be applied virtually anywhere on the planks to assure consistency between trusses.

Once the locator stops are properly positioned, the planks are attached to one another by a pressure roller or hydraulic press which presses a connecting truss plate into adjoining planks to form the truss. The completed truss is removed from the table, and another set of planks is guided into position within the locator stops. The locator stops remain in place until all trusses of the selected configuration have been formed. They are then removed, and the set-up jigs are once again placed on the table to quickly define the configuration for the next truss configuration.

Set-up systems with positioning capability have been constructed in a variety of configurations. For example, U.S. Pat. No. 5,085,414 to Weaver discloses a jig for forming trusses which includes a block designed to fit within the rails of a C-shaped channel that extends along the length of the surface of a truss table. The C-shaped channel, which is recessed within adjacent panels of the table, includes inwardly-directed lips that capture the aforementioned block. A disk-shaped stop is connected with the block by a threaded clamping bolt. The jig can be moved along the length of the C-channel and fixed at a predetermined location in which the stop can define a portion of the truss. A measuring scale fits atop and extends along the length of one of the C-channel rails, and a pointer extends from the block toward the scale to provide the operator with a reference point for positioning the jig during set-up. Another exemplary set-up jig configuration is shown in U.S. Pat. No. 4,943,038 to Harnden. This truss assembly apparatus includes a jig positioned upon a worm gear located within a C-channel. Rotation of the worm gear causes the jig to translate within the C-channel to the desired predetermined location for set-up.

Each of these C-channel-based set-up jig configurations requires that the C-channel be positioned below the table surface so that the top lips of the C-channel are level with the table surface. Although this configuration is suitable for truss tables with wooden table surfaces, it is not particularly suitable for the newer, more preferred steel-topped tables. The table surface of a steel-topped table has a relatively thin depth profile (compared to wooden table surfaces) and is preferably provided to the operator as a single slab; this can preclude the recessing of a C-channel therein.

Another significant shortcoming of these jigging systems is that the top lips of the C-channel of Weaver and the teeth of the worm gear of Harnden are prone to deflect permanently when under stress. Such stress often results when slightly warped planks are bent and forced into place after the set-up jigs are positioned. The forces exerted on the stops of the jigs by the deflected planks can easily be of sufficient magnitude to cause the lips of the C-channel to deform permanently. The deformation can be sufficiently great that the jig contained therein can no longer move freely within the C-channel, and thus is no longer usable. Deformation of the C-channel lips is particularly likely when the set-up jigs are used for both set-up and manufacturing processes. As a result, the C-channel based jigging systems are only suitable for the set-up process and should not be used as semi-permanent locator stops.

Another set-up jig design suggested for use with steel-topped tables is illustrated in U.S. Pat. No. 5,385,339 to Williams. The Williams set-up jig is a steel block having a recess on its lower surface that mates with a thin metal ruler that extends across the length of the truss table. The steel block slides upon the ruler and is fixed into a predetermined position by a bolt inserted through a laterally positioned aperture in the block and into one of the grid holes of the truss table. The most serious shortcoming of this jigging system is the susceptibility of the ruler to become bent along its edges by contact with truss planks; once this occurs, the steel block no longer slides smoothly on the ruler. Also, this system is intended to be used for set-up alone and not actual truss manufacture.

Another difficulty faced by truss manufacturers is the alignment of adjacent truss tables. Truss tables are typically constructed with relatively few C-channel rails (perhaps 6 to 8 per table) spaced at intervals of about 6 to 10 inches. Of course, a typical truss (e.g., one that is 45 feet in length) cannot fit onto a table of this size. As a result, truss manufacturers employ several truss tables positioned side-by-side to support the entire truss. The employment of multiple tables that include some type of positioning system, such as that of Weaver, Harnden, or Williams, requires that each of the tables be precisely aligned or registered with the remaining tables in order for the positioning system to be useful; otherwise, the positioning system will indicate a position for the locator stops of some tables that is longitudinally offset from proper alignment. Because truss tables can be quite heavy, it is somewhat difficult to position them precisely. Also, it may not be apparent to the operator if the tables become misaligned during repeated operations. The prior art is silent regarding the registration of adjacent tables.

It has been suggested that, instead of shifting the tables to their proper positions, a laser image of the truss be projected onto the table surfaces. See U.S. Pat. No. 5,388,318 to Petta. The use of an overhead imaging system eliminates the need for precise table positioning. However, these systems are quite expensive, and thus are not practical for many truss manufacturers. In addition, the laser image is often difficult to discern unless the truss manufacturing facility is kept quite dark, a working condition that can be difficult or even dangerous. These deficiencies render imaging systems inadequate for many manufacturers.

An additional shortcoming of prior truss tables comes to light when one or more of the truss planks is somewhat bowed or warped. As noted above, after the set-up process is complete, semi-permanent stops are placed around the truss planks to press on the planks and thereby "tighten" the joints of the truss. These semi-permanent stops are positioned, oriented and secured to the truss table based on the shape of the truss planks used for set-up. If some planks used either for set-up or in a subsequent truss are bowed or warped, the placement of the semi-permanent stops may render placement of the later-used planks within the pattern defined by the stops difficult, if not impossible. The prior art is silent regarding apparatus to address the problem of warped planks.

In view of the foregoing, it is a first object of the present invention to provide a truss plank positioning system suitable for use with the more preferred steel-topped truss tables.

It is another object of the present invention to provide a set-up jig and table combination that can withstand the rigors of the set-up and the truss formation operations over time despite the inevitable use of slightly warped truss planks.

It is a further object of the present invention to provide a truss table with a positioning system that can be easily and precisely aligned and registered with adjacent truss tables.

It is also an object of the present invention to provide a truss table with a positioning system that can be used in the darkened conditions found in some truss manufacturing facilities.

It is an additional object of the present invention to provide an apparatus for adapting the locator stops of a truss table to account for warpage and bowing in truss planks.

SUMMARY OF THE INVENTION

These and other objects are satisfied by the present invention, which as a first aspect provides a table for forming trusses that includes channels that do not unduly deform or bend during truss construction. The truss table comprises: a support frame; first and second substantially horizontally-disposed elongate panels; a first channel having a generally horizontal floor and opposed side walls extending upwardly therefrom; and a locator stop. Each of the panels has an upper surface, a lower surface, and opposing lateral edge portions, and the panels are positioned so that their respective upper surfaces are substantially coplanar and so that a first of the lateral edge portions of the first panel is in adjacent, non-contacting relationship with a first of the lateral edge portions of the second panel, thereby forming a gap therebetween. One of the side walls of the channel supports the lower surface of the first panel, and the other of the side walls supports the lower surface of the second panel. The channel floor is supported by the frame and is positioned beneath the gap between the first and second panels so that the first lateral edge portion of the first panel and the first lateral edge portion of the second panel overhang the channel floor. The locator stop includes a stop portion that resides above the panel upper surfaces, a slide portion that resides below the panel lower surfaces and that slides within the channel, and means for clamping the panels between the stop portion and the slide portion to prevent relative movement therebetween that extends within the gap. In this configuration, the panels themselves, which must be structurally substantial to withstand the rigors of truss construction, are clamped by the locator stop and are not prone to bending or deformation in the manner of channels included in prior art truss tables. Notably, this configuration can be constructed with original materials or can be retrofitted onto existing truss tables by attaching a layer of spacing members onto the upper surface of an existing table and attaching a series of panels onto the upper portions of the spacing members.

As a second aspect, the present invention provides a truss table that can be easily longitudinally registered or aligned with adjacent tables to improve the precision of truss construction. Such a truss table comprises: a support frame; first and second substantially horizontally-disposed elongate panels in adjacent, non-contacting relationship; a first channel having a horizontal floor and opposed vertical side walls supported by the frame and positioned below the gap between the first and second panels; a locator stop as described hereinabove; longitudinally-adjustable positioning indicia means (such as a measuring scale) located within the channel; and indicating means operably coupled with the locator stop and the positioning indicia means for indicating the relative positions of the locator stop and the positioning indicia means. By including in adjacent truss tables longitudinally-adjustable position indicia, the truss tables can easily and rapidly be aligned or registered with one another longitudinally. This enables the operator to employ external positioning information, such as that provided by a truss construction software, that is accurate for all tables that are in registration.

An additional aspect of the present invention is a biasing locator stop that enables the operator to selectively press on truss planks to tighten the truss joints prior to construction and to apply bending pressure to planks that may be warped or bowed. The biasing locator stop comprises mounting means for mounting the biasing locator stop to a truss table; a stop portion configured to rest against a truss plank of a truss as the truss plank rests on the upper surface of the truss table; and biasing means for biasing the stop portion away from the mounting means which is connected to the mounting means and the stop portion. Preferably, the biasing locator stop is configured to reside predominantly within a channel of a truss table to prevent damage thereto from truss planks. This can be accomplished by employing a pneumatic cylinder that biases the stop portion into the truss plank while occupying space within the channel.

DETAILED DESCRIPTION OF THE PREFERRED EMBODIMENTS

The present invention will now be described more particularly hereinafter with reference to the accompanying drawings, and which present embodiments in the invention are shown. The invention, however, be embodied in many different forms and is not limited to the embodiments set forth herein; rather, these embodiments are provided so that the disclosure will fully convey the scope of the invention to those skilled in the art.

Figure 1:
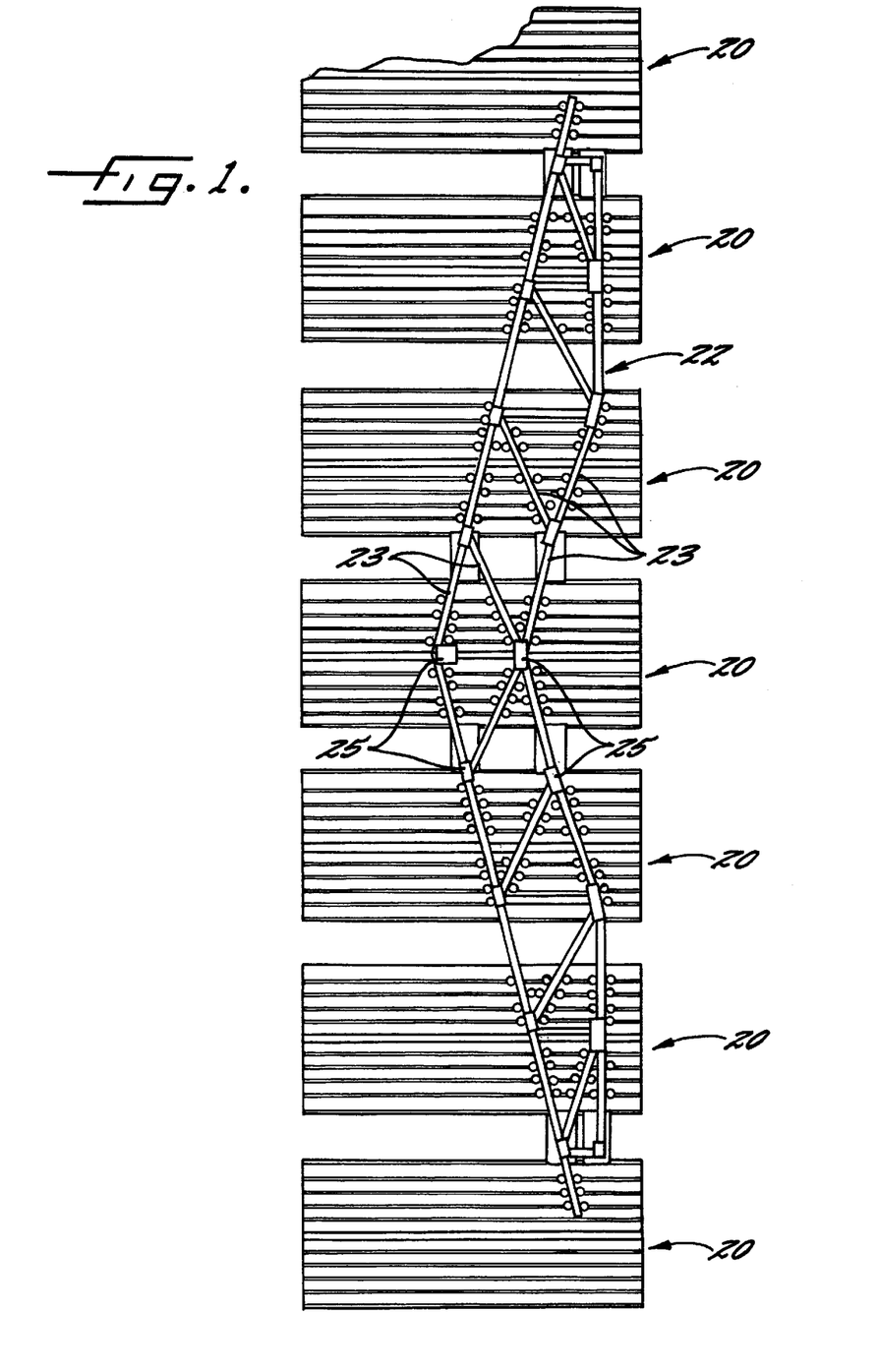
FIG. 1 is a plan view of seven truss tables of the present invention illustrating how they can be used in combination to form a single truss.

Referring now to the drawings, seven truss tables 20 upon which a truss 22 has been constructed are illustrated in FIG. 1. The truss 22 comprises a number of wooden planks 23 which are arranged in a triangulated web. The planks 23 are interconnected with one another by truss plates 25, the configuration of which can be any of those known to those skilled in this art to be suitable for interconnecting wooden planks. It should be understood that, although seven truss tables are illustrated herein, any number of truss tables can be employed together to construct a larger or smaller truss than that illustrated.

Figure 2:
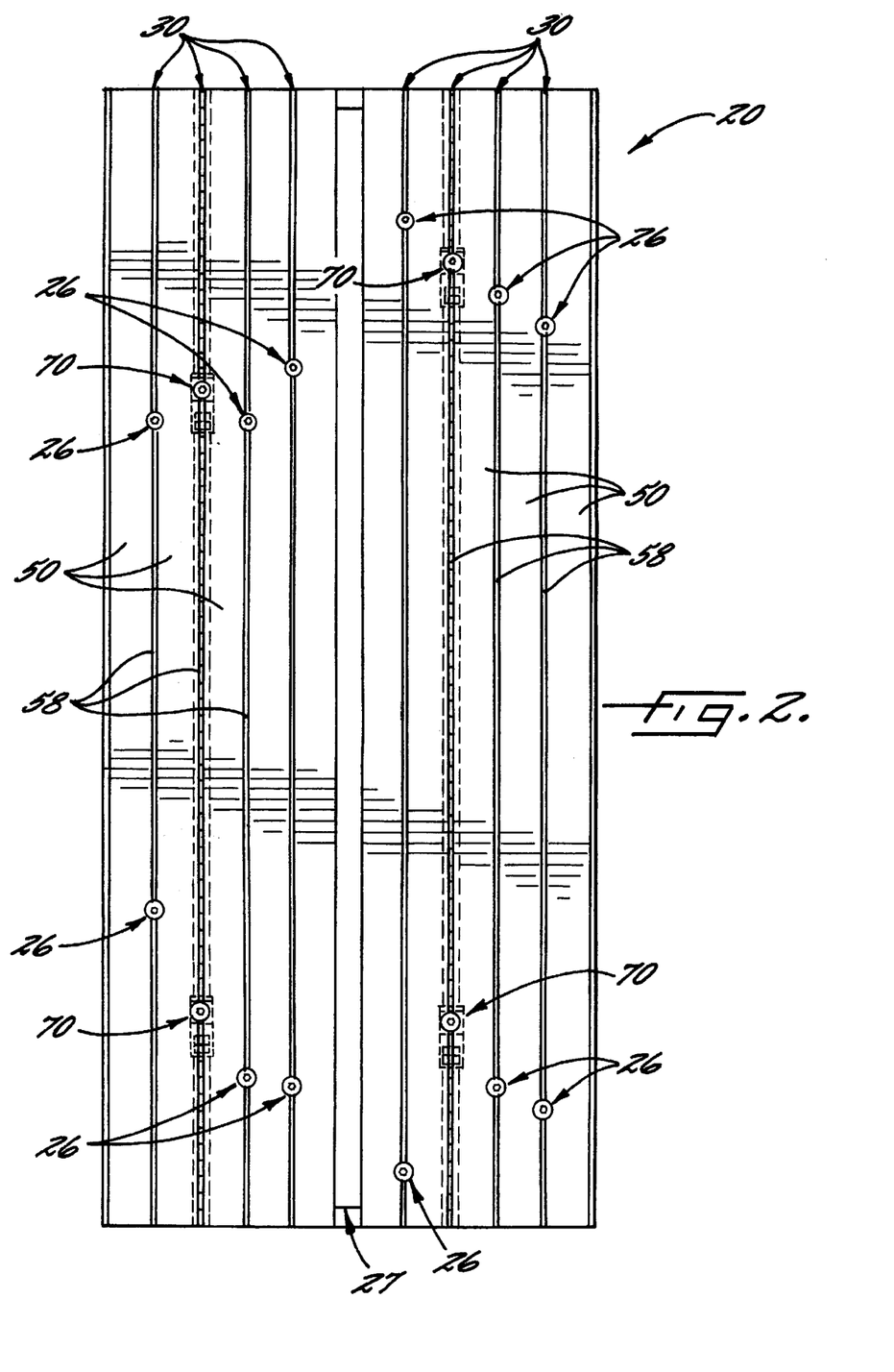
FIG. 2 is a plan view of a single table of the present invention.

Referring now to FIG. 2, a single truss table 20 of the present invention is illustrated. The truss table 20 comprises 10 horizontally disposed steel panels 50, each of which is approximately 6 inches in width and 0.75 inches in depth (best seen in FIG. 3). Those skilled in this art will recognize that the panels 50 can be of any desired width (e.g., 2 inch, 4 inch, 8 inch, 12 inch, or the like) or depth (e.g., ½ inch, 1 inch, or the like) that can withstand the rigors of truss construction, and individual panels 50 can be of equal or differing width as desired. The panels 50 can be of any length sufficient to support a truss being constructed thereon. Also, the panels 50 can be solid or can include apertures for receiving semi-permanent or moveable locator stops (not shown) as desired.

The panels 50 are elongate and are oriented to be substantially parallel to one another. Opposed lateral edge portions 56 of adjacent panels 50 are in non-contacting adjacent relationship to the lateral edge portions 56 of adjacent panels 50, thereby forming gaps 58 therebetween. Each gap 58 is typically between about ¼ and 1 inch or greater in width and is preferably about ¾ of an inch. The upper surfaces 52 of the panels 50 support the planks 23 of each truss 22 that is constructed on the table 20.

The truss table 20 also includes locator stops 26 that are positioned above and within gaps 58 between adjacent panels 50. The locator stops 26 define the triangulated pattern of the truss 22 and thus aid in placement and retention of truss planks 23 prior to and during truss construction. The locator stops 26 can be of any configuration that those skilled in this art would recognize to be suitable for defining a truss plank pattern and retaining truss planks in that pattern; exemplary locator stop configurations suitable for use with the present invention include those illustrated in U.S. Pat. No. 5,085,414 to Weaver and those employed in the Tee-Lok Quick Set-Up System (available from Tee-Lok Corporation, Edenton, N.C.). Illustratively, two locator stops 26 are included per gap 58; however, a gap 58 may contain zero, one, two, three, four, or even more locator stops 26 as desired. It is preferred that the locator stops 26 be of a configuration that can be added to or removed from a gap 58 as desired for a particular truss configuration.

The illustrated truss table 20 also includes two positioning locator stops 70 (described in greater detail hereinafter) within each of two gaps 58, and further includes a centrally-located, longitudinally-extending ejector rail 27 for ejecting trusses after construction is complete.

Figures 3, 4, 5:
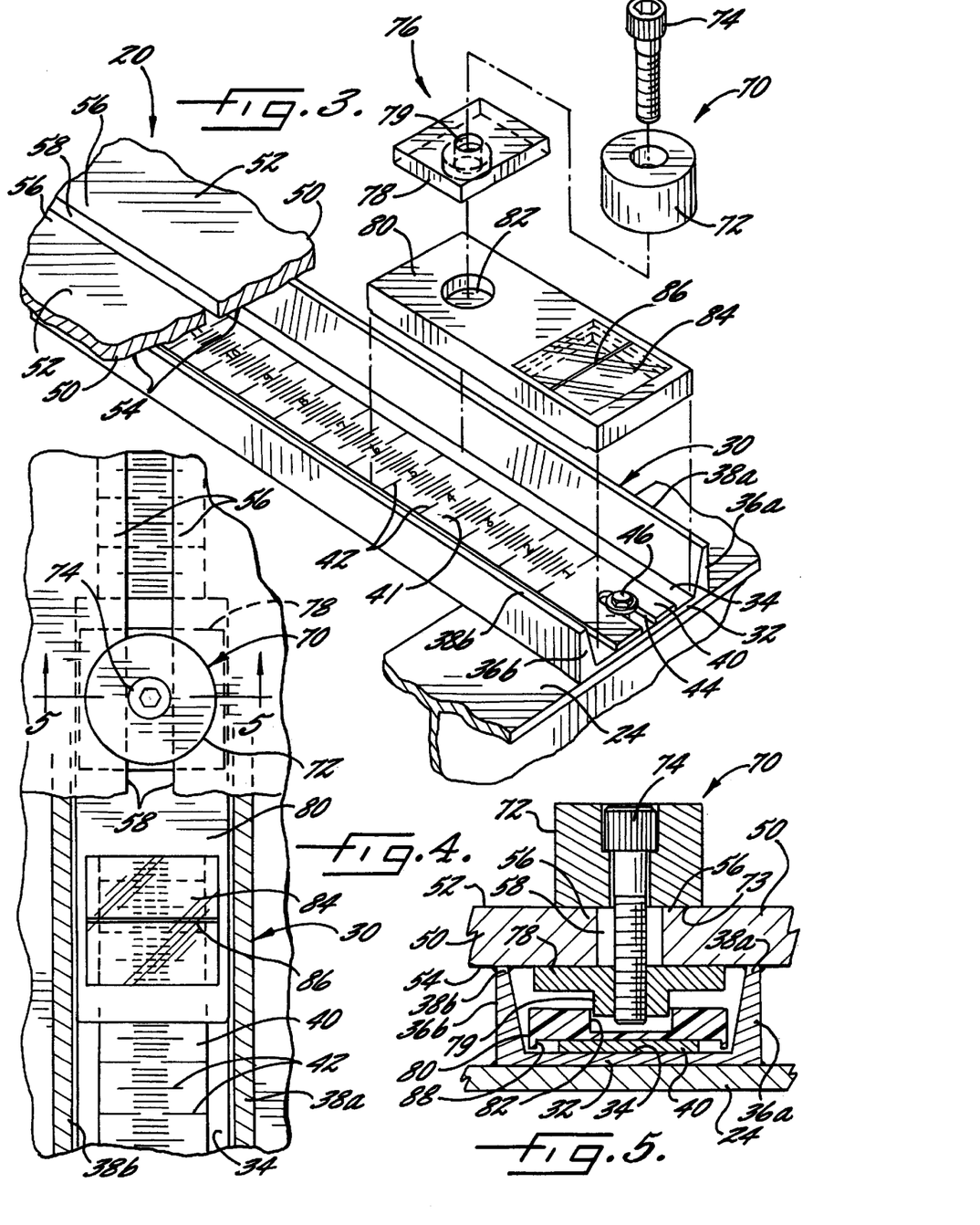
FIG. 3 is an enlarged perspective partial section view of the table of FIG. 2 showing the relationship between the components of a positioning locator stop, a channel and a pair of adjacent panels.
FIG. 4 is an enlarged cutaway plan view of the table of FIG. 2 showing one positioning locator stop positioned within a channel.
FIG. 5 is a section view taken along lines 5—5 of FIG. 4 showing a positioning locator stop in a clamped condition.

Referring now to FIG. 3, each pair of adjacent panels 50 is supported on its lower surface 54 by a longitudinally-extending channel 30, which is supported by a frame 24. Those skilled in this art will recognize that, although only one channel 30 is described in detail herein, this description is equally applicable to the other channels 30 of the illustrated truss table 20.

The channel 30 comprises a horizontally disposed floor 32 having an upper surface 34 and a pair of opposed, generally vertically disposed sidewalls 36a, 36b. The lower surface of the floor 32 is welded to the frame 24. The respective upper ends 38a, 38b of the sidewalls 36a, 36b are welded to the lower surface 54 of adjacent panels 50. The panels 50 are positioned relative to the sidewall upper ends 38a, 38b so that their adjacent lateral edge portions 56 overhang a portion of the floor 32, and the gap 58 between adjacent lateral edge portions 56 is above the floor 32. In this configuration, the channel 30 can capture, retain, and provide a sliding path for a portion of the locator stops 26 and the positioning locator stops 70.

The channel 30 can be constructed from a single unitary component, such as the channel iron illustrated herein, or can be formed of two or more pieces attached to form a channel. Preferably, the channel 30 is between about ¼ and 5 inches in height (i.e., the distance between the panel lower surfaces 54 and the channel floor upper surface 34) and between about ⅜ and 10 inches in width (i.e., the distance between facing surfaces of the side walls 36a, 36b). It is preferred that the channels 30 be smaller (having a height between about ¼ and 2 inches, with between about ½ and 1 inch being more preferred, and a width of between about ⅜ and 4 inches, with between about ½ and 3 inches being more preferred) if the channels do not house biasing locator stops, such as those described hereinafter, and preferred that the channels 30 be larger (having a height between about 1½ and 5 inches, with between 3 and 5 inches being more preferred, and a width of between about 3 and 10 inches, with between 5 and 8 inches being more preferred) for channels that house some portion, such as an air cylinder unit, of a biasing locator stop.

Figure 7:
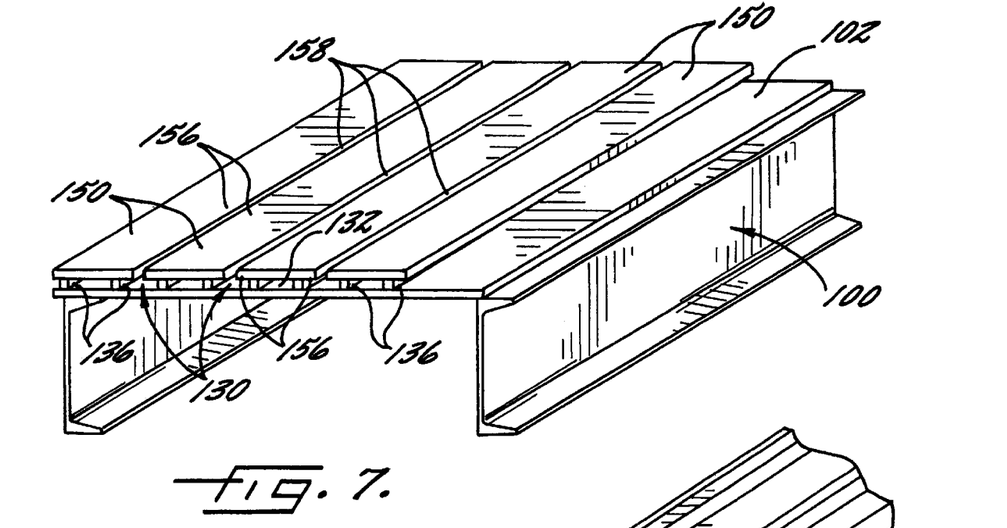
FIG. 7 is a perspective, partially cutaway view of an alternative truss table embodiment of the present invention in which a prior art truss table is retrofitted to form a truss table having a new surface.
Figure 7A:
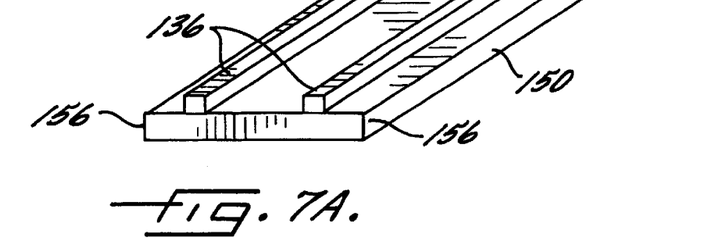
FIG. 7A is an inverted fragmentary view of a spacer-panel combination included in the truss table of FIG. 7.
Figure 8:
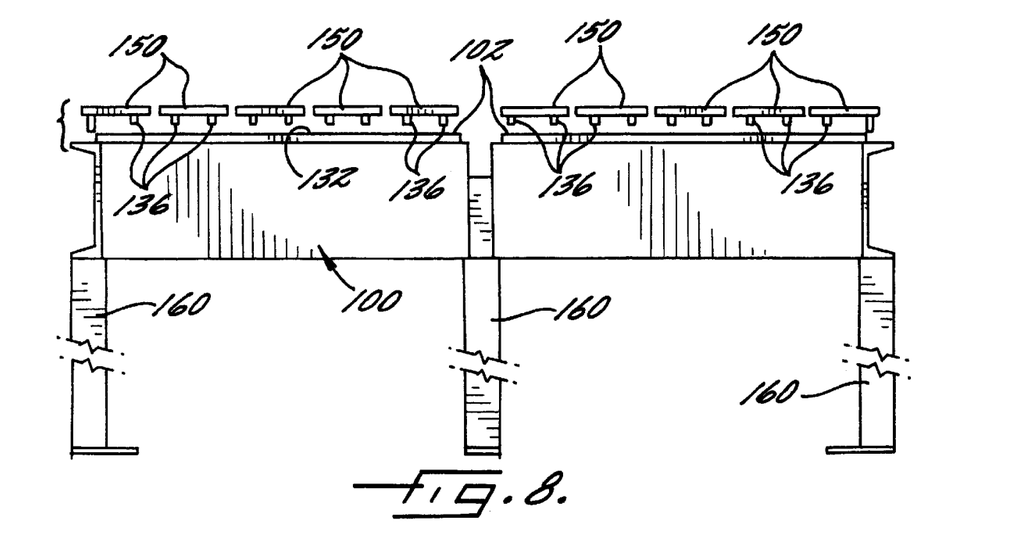
FIG. 8 is a partially cut-away and exploded end view of the truss table of FIG. 7.

As used herein, it is intended that the term "channel" also encompass an alternative truss table embodiment in which the frame 24 or other underlying structure forms the channel floor. In particular, it is envisioned that the panels and channels of the truss tables of the present invention can be formed upon an existing steel-topped or wood-topped table 100 by attaching spacing members 136 (such as ¾ inch square milled steel) to the upper surface of the existing table 100, then welding or otherwise attaching panels 150 onto the upper portions of the spacing members 136 so that their lateral edge portions 156 of adjacent panels 150 extend away from their respective spacing members and toward each other (FIGS. 7, 7A and 8). In this embodiment channels 130 are formed, with the surface 102 of the original table 100 serving as the channel floor 132, the spacing members 136 serving as the channel vertical walls, and the upper surfaces of the panels 150 serving as the new table surface for supporting truss planks. Gaps 158 are formed between adjacent lateral edge portions 156 of the panels 150. The discussion hereinabove regarding the dimensions and materials for the panels and channels is equally applicable for this embodiment. It should be understood that, although two spacing members 136 are illustrated herein to support each panel 150, a single spacing member could also be used to support each panel 150, as could three or more spacing members, if desired.

This embodiment would be particularly attractive to truss construction operators who have an existing truss table and wish to retrofit it to practice this invention, particularly if existing truss table has a steel top surface to which the spacing members 136 can be welded. It is preferred that, if a table 100 is retrofitted as described, the legs 160 of the table 100 should be shortened to lower the table top to the height of the original table.

Referring back to FIG. 3, a measuring scale 40 rests upon the channel floor upper surface 34. The measuring scale 40, which extends longitudinally within the channel 30, includes positioning indicia 42 on its upper surface 41. At each end (only one is shown in FIG. 3), the measuring scale 40 includes a longitudinally-directed adjustment slot 44 that is configured to receive a vertically-disposed threaded fastener 46 that is inserted into the channel floor 32. It is also preferred that the upper surface 41 of the measuring scale 40 be self-illuminating, such as with a phosphorescent coating, to enable it to be seen in the poor light often present in truss construction plants.

Referring again to FIG. 3, the positioning locator stop 70 illustrated therein includes an annular stop disk 72, a slide portion 76 (which comprises a sliding block 80 and a clamping block 78), and an Allen bolt 74. The stop disk 72 rests upon the upper surfaces 52 of adjacent panels 50. Although the annular configuration of the stop disk 72 is preferred for its uniformity of contact with truss planks irrespective of their relative orientation, those skilled in this art will recognize that any means for defining a pattern of truss planks and for preventing movement of a truss plank can be used with the present invention. The Allen bolt 74 extends through the aperture in the stop disk 72 and through the gap 58 between the adjacent panels 50, then is received within a threaded aperture in the square clamping block 78. An annular boss 79 protrudes from the lower surface of the clamping block 78 and is received within a recess 82 of the sliding block 80 (see FIG. 5). The sliding block 80 also includes a recess 88 in its lower surface which is configured to receive the measuring scale 40 and enable the positioning locator stop 70 to slide longitudinally thereon (FIG. 5). The sliding block 80 has a position-indicating sight glass 84 at one end, which includes a transversely-directed cross-hair 86 that is positioned above and aligns with the positioning indicia 42 of the measurement scale 40 (see FIG. 4).

Those skilled in this art will appreciate that, although the positioning locator stop 70 illustrated herein is preferred, other positioning locator stop configurations can also be used with the present invention. The positioning locator stop selected should include a stop portion for assisting in the positioning of a truss plank pattern and retaining truss planks in that pattern during manufacture, a sliding portion that enables the locator stop to be captured by and move within the channel 30, and clamping means (such as the Allen bolt 74) that clamps the lateral edge portions 56 of adjacent panels 50 between the stop portion and the sliding portion and thereby retains the locator stop at the location in which it is clamped. An exemplary alternative positioning stop is that illustrated in U.S. Pat. No. 5,085,414 to Weaver. It is intended that the present invention encompass configurations in which the stop and slide portions directly contact the panel upper and lower surfaces and those in which there is some structure, such as a shim or overhanging channel lip, between the stop or slide portions and the table panels.

Figures 6, 9:
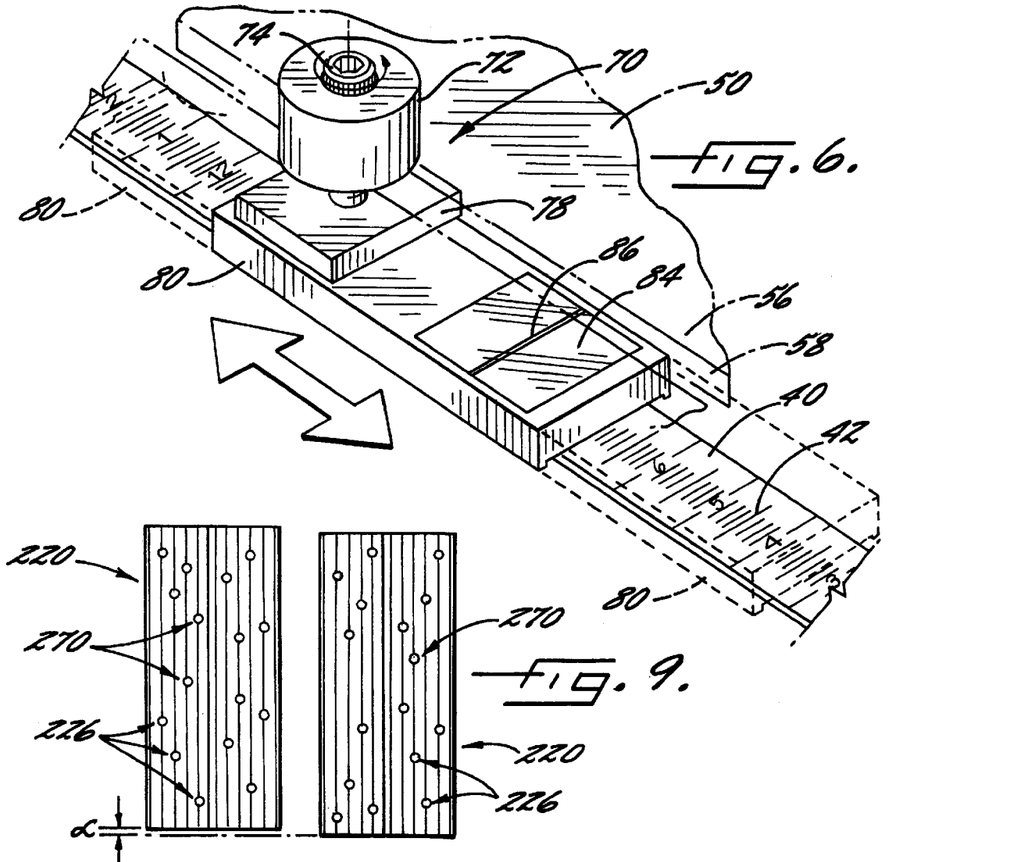
FIG. 6 is an enlarged perspective view showing a locator stop in place with one panel illustrated in phantom line.
FIG. 9 is a plan view of two adjacent tables of the present invention which are slightly offset longitudinally.

The use of the truss table 20 can be best understood by reference to FIGS. 4 through 6. Initially, a desired position for the locator stop 70 is selected from manual drawing or is provided by a truss construction software program such as FREEFORM (available from Trenco Engineering, Edenton, N.C.). The position for the locator stop 70 should indicate the proper location of the cross-hair 86 of the sliding block 80 relative to the measuring scale 40, which should in turn position the stop disk 72 at the desired location along the length of the channel 30. At this point the Allen bolt 74 is loosened such that the stop disk 72 and clamping block 78 are not clamped tightly to lateral edge portions 56 of adjacent panels 50. The indexing locator stop 70 then slides within the channel 30 to the selected position, with sliding motion halted when the cross-hair 86 is aligned with the selected location on the position indicia 42 of the measuring scale 40 (FIG. 5). At that point, the Allen bolt is tightened so that the stop disk 72 and clamping block 78 clamp onto, respectively, the upper surfaces 52 and lower surfaces 54 of adjacent panels 50 (FIG. 6). Once the Allen bolt 74 is sufficiently tight, the positioning locator stop 70 will remain in place as truss planks are positioned against it. After each of the positioning locator stops 70 is in place, the truss planks can be placed into their proper positions, the locator stops 26 are moved within their respective channels 30 to rest against the truss planks and are clamped into place. Truss plates are positioned at the joints of the truss and pressed into the truss planks. The completed truss is ejected with the ejector rail 27 and a new set of truss planks is positioned with the positioning locator stops 70 and the locator stops 26 as guides.

It should be noted that, when the positioning locator stops 70 are clamped into place, they are clamped to lateral edge portions 56 of adjacent panels 50. As these panels 50 are formed of steel or some other sufficiently strong and rigid material and are of substantial thickness, they are not prone to bending or deforming as are the prior art channels, which are typically formed of relatively thin (e.g., 1/16 inch) steel. As a result, the positioning locator stops 70 and locator stops 26 can be used not only for the set-up process, but also for actual truss manufacture, thus eliminating the need for the semi-permanent stops required by prior art tables. Also, the truss table 20 of the present invention advantageously employs locator stops which slide within channels recessed below the upper table surface 52 and therefore are not as susceptible to damage from truss planks as prior locator stops employed with steel-topped tables, such as that illustrated in U.S. Pat. No. 5,389,339 to Williams, which rely on above-table slides.

In addition, it is envisioned that the panels 50 and channels 30 included in the present invention can serve as a portion, or module, of a truss table. For example, many truss tables wear more quickly at one end if that end is generally used to support the "bottom" chord of trusses. For such a table, the channels and panels illustrated herein can be employed as the support surface for the bottom chord area of the table, and an abutting wooden-topped portion can be used as the support surface for the top chord area of the table. This may provide economical use of materials in the resulting hybrid truss table.

Figures 10A, 10B:
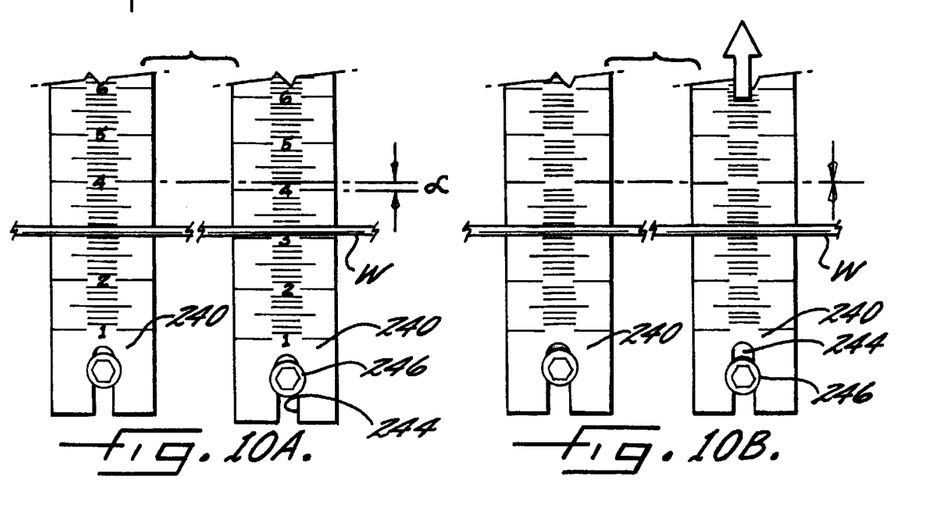
FIG. 10A is a greatly enlarged cutaway view of measuring scales of the adjacent tables of FIG. 9 illustrating their misalignment.
FIG. 10B is a greatly enlarged plan view of the tables of FIG. 9 after they have been registered through longitudinal adjustment of one measuring scale.

An additional advantage of the table of the present invention is illustrated in FIGS. 9, 10A and 10B. FIG. 9 shows a pair of adjacent truss tables 220, one of which is positioned to be slightly offset from the other in the longitudinal direction. Offset positioning such as this is quite common, as it can be difficult to precisely align large, heavy truss tables. As is illustrated in FIG. 10A and indicated therein by δ, the measuring scales 240 of these offset tables 220 are similarly mismatched. However, the inclusion of the adjustment slots 244 in the measuring scales 240 enables either measuring scale 240 to be longitudinally adjusted relative to its underlying table 220. As a result, the measuring scales 240 can be adjusted so that they are in proper registration (FIG. 10B). Proper registration can be indicated by some aligning device, such as a wire w, that reaches between adjacent tables 220. Registering each of the measuring scales 240 of each of a set of adjacent truss tables 220 assures that positioning information, such as that provided by a truss construction computer program, will be accurate for each of the truss tables 220. Once the measuring scales 240 are in alignment, they can be fixed into position by tightening the threaded fasteners 246 at each end of each measuring scale 240. As long as adjacent tables 220 are properly and precisely spaced laterally, a precise two-dimensional positioning grid is thus formed by adjacent tables.

Those skilled in this art will appreciate that, although the measuring scale 240 illustrated herein is preferred, any number of measuring scale configurations which are longitudinally adjustable can be used with the present invention. For example, the measuring scale 240 can be attached to the table 220 with a pressure-sensitive adhesive that enables the scale to be peeled off and reapplied repeatedly. It can also be held in place with some variety of releasable clamping device. Other apparent configurations will be apparent to those skilled in this art.

Figure 11:
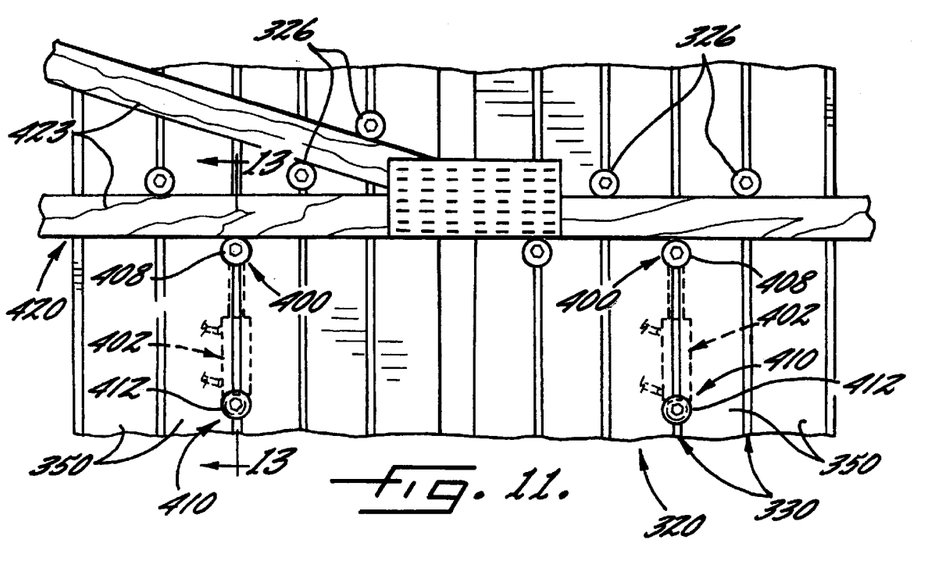
FIG. 11 is an enlarged view of another embodiment of a table of the present invention which includes two moveable pressure stops.
Figure 12:
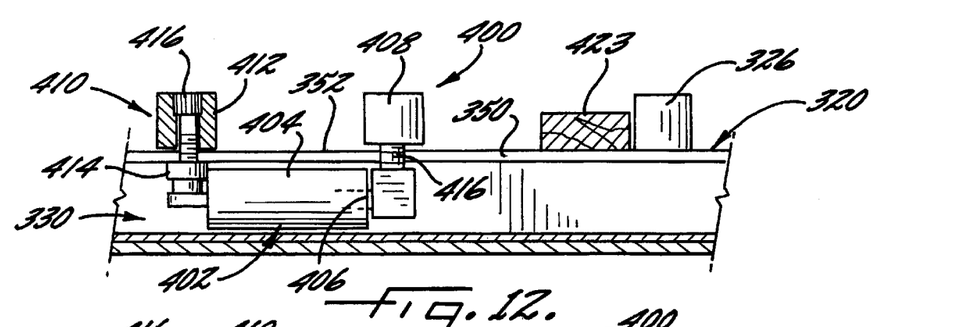
FIG. 12 is a section view of the table of FIG. 11 showing one moveable pressure stop in its retracted position.
Figure 13:
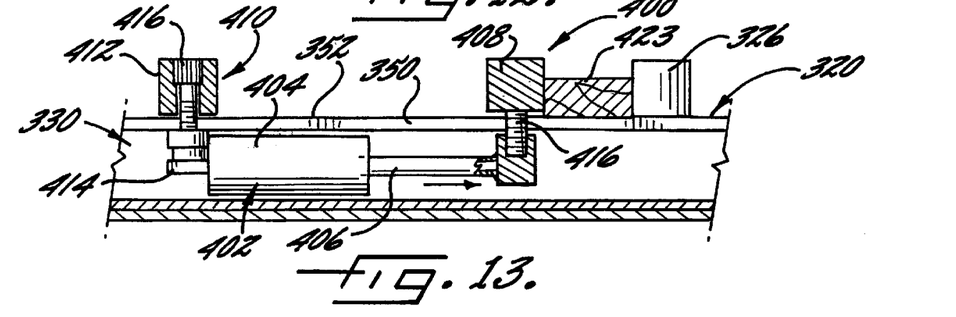
FIG. 13 is a section view taken along lines 13—13 of FIG. 11 showing a moveable pressure stop in its extended position.

Another embodiment of the truss tables of the present invention is illustrated in FIGS. 11 through 13, in which a truss table 320 is illustrated. This table includes panels 350, channels 330, locator stops 326, and positioning locator stops 370 as are illustrated in the truss table 20 of FIGS. 1 through 6. However, the truss table 320 includes a pair of biasing locator stops 400, each of which comprises an air cylinder unit 402 having an air cylinder 404 and a shaft 406, a pressure stop 408, and a mounting clamp 410. The mounting clamp 410, which can comprise a stop disk 412 positioned above the panel upper surface 352, a clamping block 414 positioned within the channel 330, and an interconnecting clamping bolt 416, or other mounting means is attached to one end of the air cylinder 404. The shaft 406, which retracts within and extends from the air cylinder 404, is attached at its free end to the pressure stop 408. Both the air cylinder 404 and the shaft 406 reside within a channel 330. The pressure stop 408 is positioned above the upper panel surface 352 and is attached to the free end of the shaft 406 via an interconnecting bolt 416.

In operation, the biasing locator stop 400 is positioned so that the air cylinder unit 402 resides within one of the channels 330 of the truss table 320 and so that the pressure stop 408 is located a short distance from a truss plank. The mounting clamp 410 is then tightened so that the biasing locator stop 400 is fixed relative to the panels 350 of the table 320. The air cylinder unit 402 is then actuated with an external air source (not shown) to extend the shaft 406. The shaft 406 extends until the pressure stop 408 contacts the truss plank and presses it against an adjacent locator stop 326 or 370.

Including biasing locator stops 400 can help to provide the truss being constructed with "tight" joints, particularly if moveable locator stops 400 are applied to both the top and bottom chords of the truss. In addition, the biasing locator stops 400 can be used so that slightly warped planks are pressed into the proper configuration prior to the truss being joined together with truss plates. This procedure is considerably simpler than attempting to force warped truss planks into a pattern defined by an overabundance of locator stops. Also, placement, clamping, and actuation of the biasing locator stops 400 should be more rapid than deployment of semi-permanent locator stops.

Although the illustrated configuration for the biasing locator stops 400 (in which the air cylinder unit 402 is positioned within a channel 330 and thus is protected from direct contact with truss planks that might damage it) is preferred, other configurations for a moveable locator stop are contemplated. For example, a mounting peg that fits within a grid hole in a table panel 350 could be easily and conveniently used to mount the biasing locator stop 400 to the table 320. Also, if a particular table or set of tables is intended for exclusive construction of a particular truss (such as for prefabricated mobile home trusses), the biasing locator stop could even be fixedly mounted to the table, either within a channel 330 or above the upper panel surface 352. Further, other means for biasing the pressure stop 408 away from the mounting location and toward a truss plank, such as a hydraulic cylinder, a mechanical spring, or an electromagnetically-driven piston, could also be employed.

The embodiments illustrated and described above disclose typical embodiments of the invention and, although specific terms are employed, they are used in a generic and descriptive sense only and not for the purposes of limitation, the scope of the invention being set forth in the following claims.

That which is claimed is:

1. A table for forming trusses, comprising:

a support frame;

first and second substantially horizontally-disposed elongate panels, each of said panels having an upper surface, a lower surface, and opposing lateral edge portions, said panels being positioned so that their respective upper surfaces are substantially coplanar and so that a first of said lateral edge portions of said first panel is in adjacent, non-contacting relationship with a first of said lateral edge portions of said second panel to form a first gap therebetween;

a first channel having a horizontal floor and opposed vertical side walls, said first channel floor being supported by said frame and positioned below said first gap;

a third generally horizontally-disposed elongate panel having upper and lower surfaces and opposed lateral edge portions, said third panel being positioned so that said third panel upper surface is substantially coplanar with said first and second panel upper surfaces and so that a first of said third panel lateral edge portions is in adjacent, non-contacting relationship with a second lateral edge portion of said first panel to form a second gap;

a second channel having a generally horizontal floor and generally vertical and opposed side walls extending upwardly therefrom, said second channel floor being supported by said frame and positioned below said second gap;

a locator stop which includes a stop portion that resides above said panel upper surface, a slide portion that resides below said panel lower surface and that slides within said first channel, and means for clamping said panels between said stop portion and said slide portion to prevent relative movement therebetween, said clamping means extending within said first gap; and compressing means attached to one of said panels or one of said channels for compressing truss planks arranged in a truss pattern against said locator stop, said compressing means being configured to be releasably attached to one of said channels, wherein said compressing means includes a pneumatic cylinder unit having a cylinder and a retractable shaft and having a second locator stop attached to said shaft.

2. The table defined in claim 1, wherein said pneumatic cylinder is positioned within one of said channels.

3. The table defined in claim 2, wherein said second channel side walls are separated by a distance of between about ⅜ and 10 inches.

4. The table defined in claim 3, wherein said third panel lower surface and said second channel floor are separated by a distance of between about ¼ and 5 inches.

5. A biasing locator stop for use with a truss table having a upper surface for supporting a plurality of truss planks during the formation of trusses thereon, said biasing locator stop comprising:

mounting means for mounting said biasing locator stop to the truss table;

a stop portion configured to rest against a truss plank of a truss as the truss plank rests on the upper surface of the truss table; and biasing means for biasing said stop portion away from said mounting means, said biasing means being connected to said mounting means and said stop portion, wherein said biasing means comprises a pneumatic cylinder unit having a pneumatic cylinder and a shaft that is extendable from and retractable within said pneumatic cylinder, said shaft having a free end, and wherein said stop portion is attached to said shaft free end.

6. The biasing locator stop defined in claim 5, wherein said mounting means comprises releasable clamping means for clamping said biasing locator stop to a channel within the truss table.

7. The biasing locator stop defined in claim 6, wherein said clamping means comprises a block that is configured to reside within the truss table channel, said block including a threaded aperture, and a threaded fastener that is received within said block aperture, wherein rotation of said threaded fastener within said block aperture causes said mounting means to clamp said biasing locator stop to the truss table.

8. The biasing locator stop defined in claim 5, wherein said pneumatic cylinder unit is configured to reside within a channel of the truss table as said stop portion is positioned against a truss plank above the upper surface of the truss table.

* * * * *